Aug. 4, 1970     C. G. KALT     3,522,665
TEACHING SYSTEM
Filed Dec. 12, 1967     3 Sheets-Sheet 1
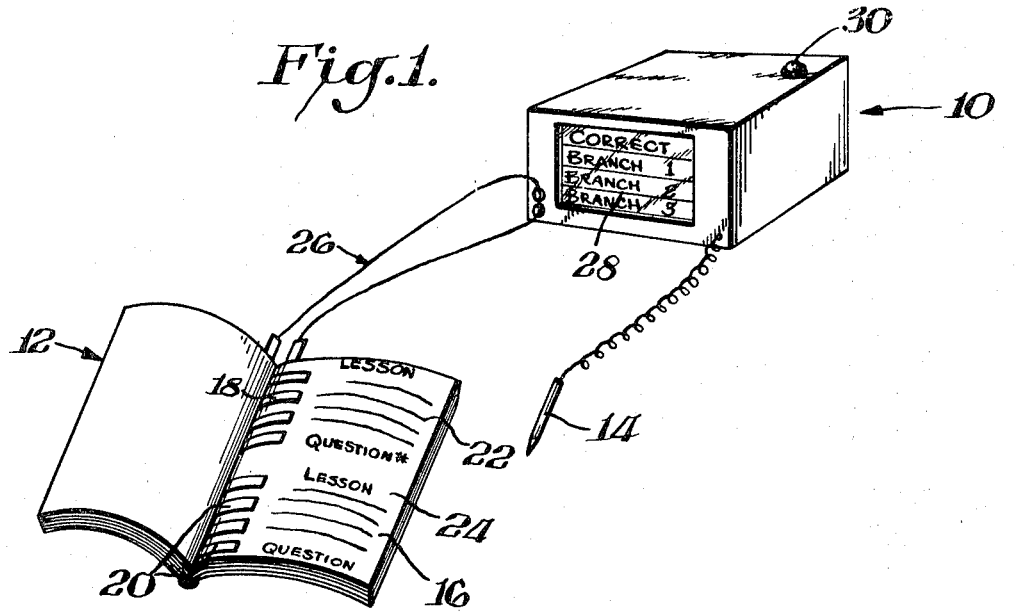
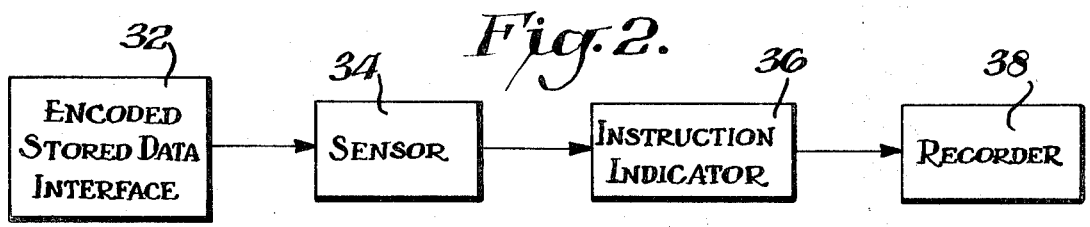
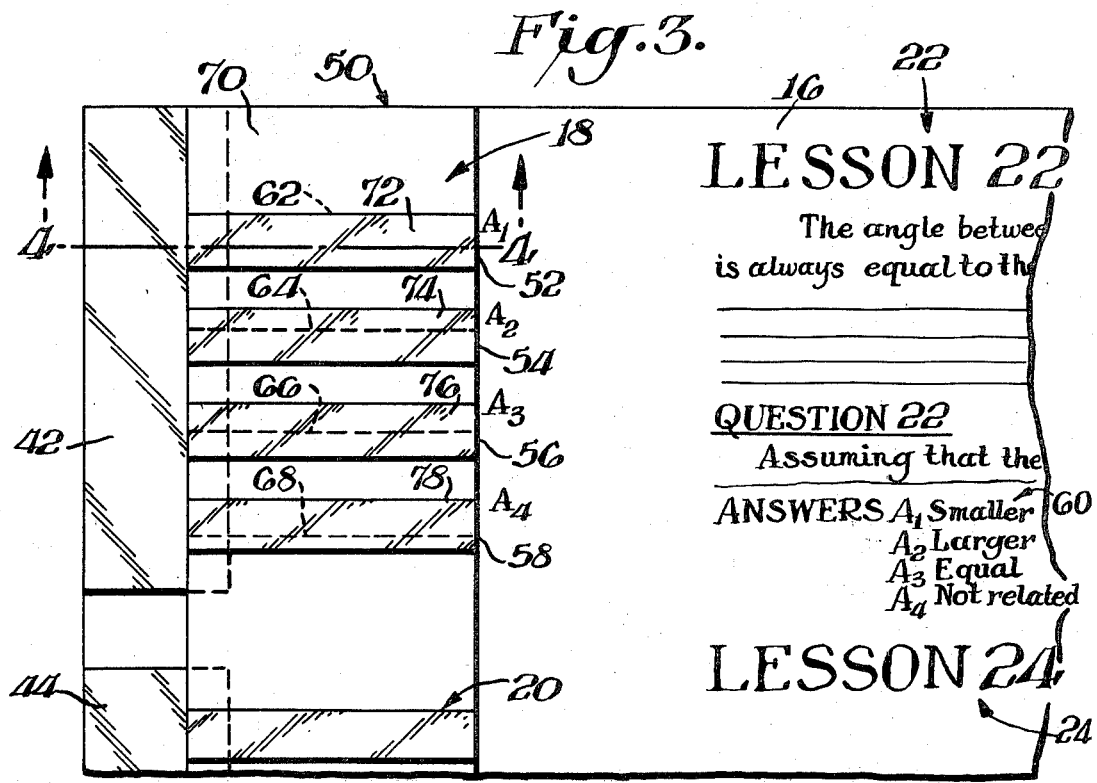

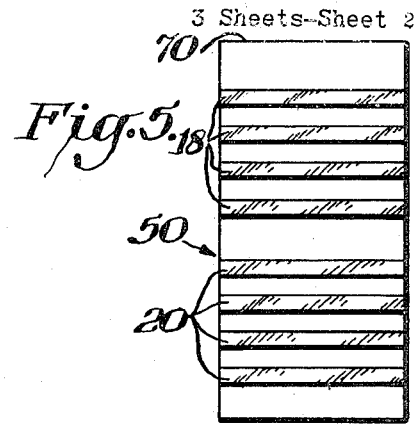
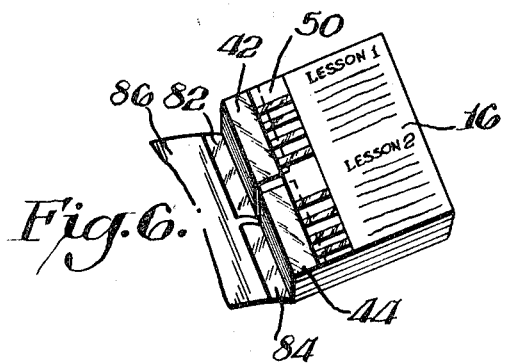
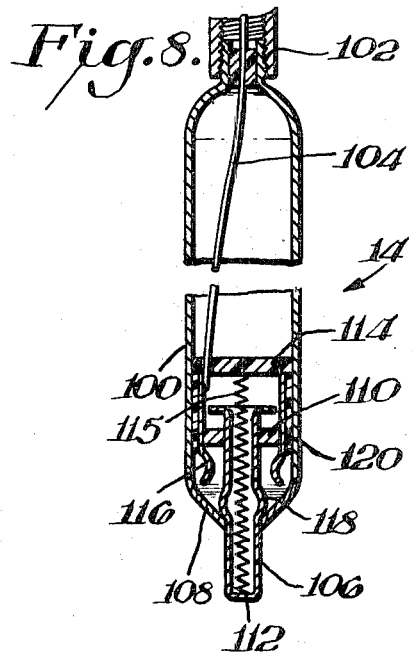
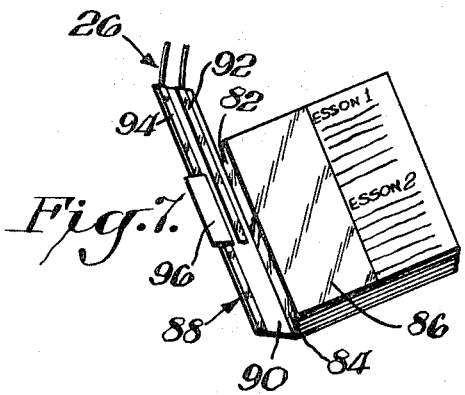
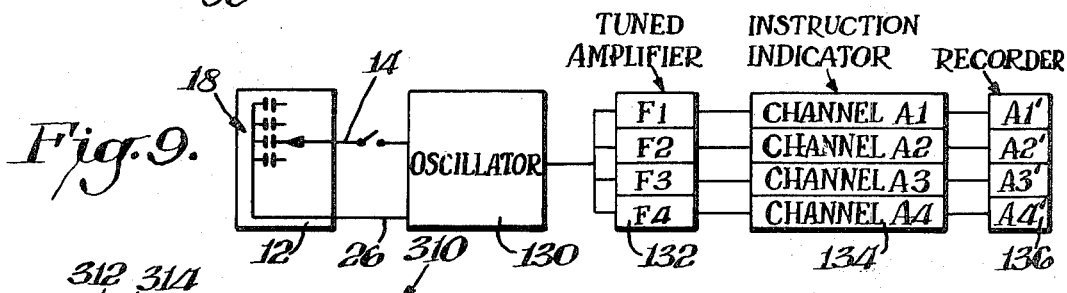
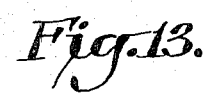

Aug. 4, 1970

C. G. KALT 3,522,665

TEACHING SYSTEM

Filed Dec. 12, 1967

United States Patent Office 3,522,665
Patented Aug. 4, 1970

3,522,665
TEACHING SYSTEM
Charles G. Kalt, Williamstown, Mass., assignor to Sprague Electric Company, North Adams, Mass., a corporation of Massachusetts
Filed Dec. 12, 1967, Ser. No. 689,980
Int. Cl. G09b 7/08
U.S. Cl. 35—9                                    21 Claims

ABSTRACT OF THE DISCLOSURE

Encoded information coordinated with information bearing indicia of a sheet is selectable by a person for coupling to a control unit for communication of selected information thereto in accordance with the person's comprehension of said indicia.

BACKGROUND OF THE INVENTION

The present invention relates to a teaching system and more particularly to a teaching system having an encoded interface page.

In general, teaching systems implant knowledge by means of a programmed or disciplined dialogue between a person and an information source. Consequently, such systems generally include a source of stored information, an instructional control unit and an interface for communication between a person and other portions of the system. For high efficiency, the system should be capable of operating in a test, drill and/or programmed instruction mode.

Since a vast amount of stored information is required for a satisfactory teaching level, many of the more advanced systems utilize expensive devices and interfaces. For example, conventional computer arrangements generally utilize a large memory bank, a costly interface and also require programming in the language of the computer. Hence, the use of prior art systems has been limited by their high cost, bulky memory, and complex machine language.

In accordance with the invention, the organization and memory of a book are combined with an inexpensive instructional control apparatus such as a small computer in such a manner as to be useful in the areas of programmed instruction and multiple choice testing. The device is based on the concept of including electrical elements on pages of the book so that each page is adapted to be electrically coupled to the computer. After reading a portion of the text the student communicates with the combined computer-book by applying a stylus to an appropriate element. The computer-book complex responds by means of appropriate audio and/or visual replies to the student inputs.

The programmed content of the response, although not visible in the book, is contained in its encoded memory. The computer-book reinforces student learning and measures and records the quality of each student response, as well as the time required for that response. Hence, the device combines the most important features of computer assisted instruction with multi-media presentation in very inexpensive and flexible form.

Consequently, the novel system provides a programmed and recordable dialogue between book and student with multimedia instructional response, less expensive by an order of magnitude than was previously considered possible. This vastly expands the depth and meaning and usefulness of the book. It frees the teacher from much of the routine of drilling, testing and explaining, and makes possible a much more cerative and important use of his or her efforts. It frees the student from the lock step of synchronous teaching and makes possible an active, creative attitude as opposed to a passive and following attitude. Significantly this freedom is not gained at the expense of discipline.

The system combines the highly refined program and memory of a book with the logical functions of an electronic computer. It includes input and output interfaces capable of logical dialogue with the student, directly in the language of the student, with no synthetic computer language required. The book is of course organized by page, and each page consists of one or more sections or frames; each based on a given unit of subject matter. The units are arranged differently for the three basic modes of operation, that is programmed instruction, testing and drilling, however, the same equipment may be used for all three.

In general, the object of programmed instruction is to induce the student to discover concepts or relationships in a situation or body of fact. This is accomplished in the novel system by first providing a statement of fact. This would usually consist of a paragraph or more of printed matter, sometimes reinforced by a picture. Following this, a question regarding the statement of fact is asked. A special interface makes possible an instant response to the question by the student. Since the input mechanism is within the book, and is placed at the location of the question there is no distracting necessity for the student to move his eyes or his attention to any other spot. The mechanical response of the student operating a stylus is translated into an electric signal which is recognized by the device.

The device scores the student on his response and advises him what to do next. The advice might be "Correct, go on to the next question."; "There is a better answer, try again."; "Incorrect, reread the question and try again."; "Incorrect, read the material on Page 19 and try again."; or some other appropriate response.

In testing, the object is to examine and record the student's knowledge and understanding of a set of concepts, relationships or facts, and possibly his ability to apply his knowledge usefully to a problem. This differs from programmed instruction in that it is not desirable during the examination to indicate to the student the quality of his response. Thus in this mode of operation, the device secretly records the quality and time required for each answer and communicates to the student only instructions on what to do next.

The object of drilling is to shape and sharpen the memory of the student to rapidly and accurately deal with quantities of facts as in vocabularies or relationships. In the drill mode the device would be set up to visually and/or audibly indicate correctness of response without making a record or score of the drill. Thus a section of drill work could be used over and over until the student felt satisfied with his proficiency.

The instructional control apparatus of the invention determines and records the correctness of student response and the time required for each response. It determines what program path the student should take and indicates visually and/or audibly the instructions as to the path and the correctness of student response. In addition, it may cue auxiliary media, such as film strip or audio tape, to provide additional instructional material in coordination with the book program. Owing to the electronic nature of the control unit, it may be made large or small, fixed or portable, with many variations of quality and function. Most of its size and shape are determined by audio and/or visual interfaces.

In one embodiment, the book is coupled to the control apparatus by means of a stylus. The stylus, which is the shape and size of a ball point pen, is mechanically and electrically connected to the computer by a short flexible cable. It is constructed so as to make it extremely improbable that a false or accidental response will be made. For example, each time the stylus is depressed the computer can record the fact, irrespective of whether a logical answer was given or not. This makes possible the capability of indicating the students' proficiency at following instructions.

It is an object of this invention to provide an inexpensive teaching system.

It is another object of this invention to provide a multimedia teaching system.

It is a further object of this invention to provide a teaching system which requires minimum training and dexterity for operation.

It is a still further object of this invention to provide a teaching system having an encoded interface which combines the organization and memory of a book with an instructional unit.

Another object of this invention is to provide a simple inexpensive means of communication between a person and machine-book complex.

A still further object of this invention is to provide a machine interface which utilizes a plurality of electrical means coordinated with printed indicia for input of encoded information to the machine.

These and other objects of the present invention will be apparent from the following description, the illustrated embodiments, and the appended claims.

SUMMARY OF THE INVENTION

Broadly, a teaching system provided in accordance with the invention comprises a sheet having encoded information coordinated with indicia of the sheet, said encoded information being selectable by a person for communication of said selected information to an instructional control unit.

In a more limited sense, the teaching system comprises a page having encoded information elements which are identified with printed indicia of the page and are selectable by a person for coupling to an instructional control unit for communication of encoded information thereto, and said control unit providing a feedback of information to said person in response to said selected information.

In a still more limited sense, the teaching system comprises a book which includes an encoded page having, electromagnetic elements coordinated with printed indicia of the page, and said elements adapted for selectable connection to a sensing means which is responsive to the selected element.

BRIEF DESCRIPTION OF THE DRAWING

FIG. 1 is a perspective view of a teaching system provided in accordance with the invention;

FIG. 2 is a block diagram of the teaching system illustrated in FIG. 1;

FIG. 3 is a plan view of a portion of an encoded page utilized in one embodiment of the teaching system of FIGS. 1 and 2;

FIG. 4 is a sectional view of the page of FIG. 3 taken along line 4—4;

FIG. 5 is a plan view of an element overlay employed in the construction of the encoded page of FIG. 3;

FIG. 6 is a perspective view illustrating a step in the construction of an encoded book within the scope of the invention;

FIG. 7 is a perspective view illustrating a further step in the construction of an encoded book;

FIG. 8 is a view in section of a stylus utilized in one embodiment of the invention;

FIG. 9 is a more detailed block diagram of the teaching system of FIG. 1;

FIG. 13 is a plan view of an answer matrix provided in accordance with the invention.

DESCRIPTION OF THE PREFERRED EMBODIMENT

Figure 10:
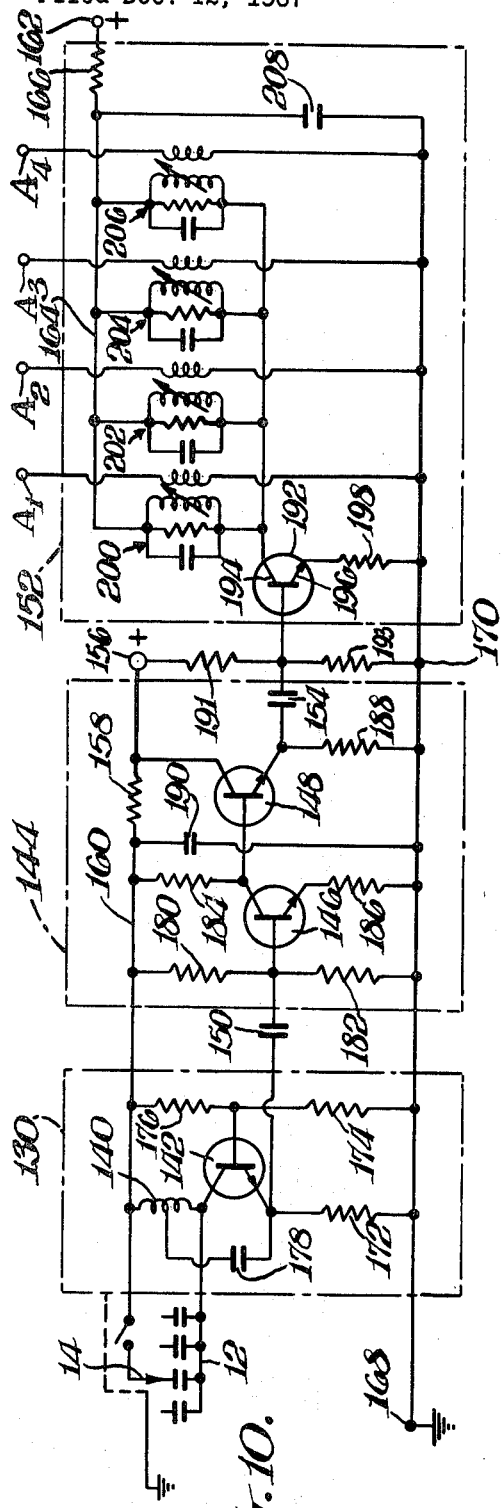
FIG. 10 is a schematic diagram of the oscillator and tuned circuit portions of the teaching system of FIG. 9.

As shown in FIGS. 1 and 2, the teaching system of this embodiment consists of an instructional control unit 10, an encoded book 12 and a stylus 14. At least one page 16 of book 12 carries encoded information 18 and 20 in addition to information bearing indicia 22 and 24. In this embodiment, the encoded information is provided in the form of electrical elements which are coordinated with printed indicia of the page. For descriptive purposes, two element groups 18 and 20 are shown adjacent to indicia groups 22 and 24 respectively. Each group of elements is connected to a respective conductor of the binding and through it to control unit 10 by means of leads 26.

The other end of each element provides an exposed contact area which adapts each element for coupling to control unit 10 by means of stylus 14. Hence, each element is selectable by a student or other operator for communication of information to unit 10. The individual elements are coordinated or indentified with particular indicia of the page so that selection by the student (that is, coupling by probe 14) provides an encoding of the associated indicia to control unit 10. Consequently, book 12 provides a programmed information source for both the person and the apparatus as well as an interface between them.

In this embodiment, the student proceeds by reading expository statements of page 16, answering test questions, and accepting directional guidance from indicator 28 of the control unit 10. As he proceeds, the student simultaneously learns material in the program and is scored on the quality and speed of his responses. A detailed record of his progress may be kept automatically, and electronic monitoring information, for example by indicator light 30, may be supplied to the instructor or directly to a central computer.

The apparatus of FIG. 1 is shown in block diagram form in FIG. 2. Herein, book 12 is represented as an encoded stored data interface 32 while instructional control unit 10 includes sensor 34, instruction indicator 36 and recorder 38.

Generally, the stored data interface 32 will include expository instructional material followed by a multiple choice question, whose answers are coordinated with or referenced to one of the electrical elements of the page. The student operates the system by first reading the explanatory subject matter and the question. He then chooses a specific answer and communicates his selection to sensor 34 by touching stylus 14 to an exposed contact terminal of the element assigned to his choice of answer.

Consequently, stylus 14 essentially operates to complete the circuit between the interface book 12 and sensor 34. Thereafter, sensor 34 senses or identifies the selected element and, in turn, triggers one information channel of instruction indicator 36 which feeds back further instruction or direction to the student. This instruction feedback is provided in the illustrated example by an optical or visual display; for example by illuminating one of a plurality of directions of indicator 28.

Advantageously, the system combines both machine readable and man readable information in sheet or book form. Hence, it inexpensively provides a large amount of stored data combined in an inexpensive student-machine interface. This communication interface makes the system useful for many different purposes and many stages of learning from rudimentary to higher education since the printed indicia may be pictures or geometric forms rather than letters, words, and numerals. For elementary training, the feedback may also be provided in a suitable form such as colored lights, pictures, or audio or the like.

Many uses other than conventional instruction are also cloth may be coated or saturated wtih any conductive material such as graphite, silver or copper by any number of means such as dipping, plating, vapor deposition or the like. The scrim is then applied to the pages and the latter are bound together by both conventional and conductive adhesive such as a silver loaded cement, the latter being selectively applied to provide a separate conductive path from conductive strip 42 and 44 through the scrim.

Thereafter, scrim 86 may be directly attached to braided or flexible leads which extend from the binding, or it may be connected to a separate lead strip as shown in FIG. 7. Herein, a conductive binding strip 88 is shown in an unattached position adjacent the scrim at the back of the book. In this example, binding strip 88 includes a sheet or support strip 90 of insulative material and two flexible conductive strips 92 and 94 which extend vertically along the binding. Strip 92 extends only a short distance within the binding and contacts scrim conductor 82 whereas strip 94 extends the full length of the binding so as to contact conductor area 84. Finally, strip 94 is insulated from conductor 92 by an insert 96 of insulative material.

Insert 96 and support strip 90 may be of any insulative material such as an organic polymer or paper or the like, and binding leads 92 and 94 may be metal braid, flat stock or thin films of any suitable metal such as aluminum, nickel, copper, or the like.

In the illustrated embodiment, support strip 90 also extends beyond the end of the binding so as to support the connection of leads 26 to binding strips 92 and 94, however, this extension is not necessary where the leads are self-supporting; such as where the leads 92 and 94 are made of braided or heavy flat stock.

As in the scrim assembly, binding strip 88 is secured to the book by selective application of a conductive adhesive, such as a silver bearing adhesive which is applied in the areas where low resistance contact between the binding conductors 92, 94 and scrim conductors 82, 84 is required. In other areas of the binding, conventional non-conductive adhesive or cement may be applied for additional strength.

In each case, the binding leads may extend the full length of the book binding but yet be exposed to electrical contact in appropriate areas of the back of the book. For example, if four parallel strips are employed, insulator 96 may run the full length of the binding and have holes or apertures spaced along it so as to provide appropriate conductive paths from the binding leads to respective scrim conductors. (Of course, for a book having a single binding conductor, selective application of the conductive cement is unnecessary.) In this manner a plurality of leads may be brought out of the book.

Advantageously, the binding leads may be connected and brought out of the book in many different ways. For example, in a loose leaf arrangement the binding lead could be connected to the conductive strip of each page by spring contacts. In addition, a quick disconnect connection such as a spring clip or the like could be made between the control unit leads 26 and the binding leads 92 and 94. Moreover, instead of the conductive paths extending longitudinally along the binding as shown, the conductive strips could be horizontal paths which run from the binding area to leading edges of the front and back cover.

As shown in FIG. 8, the stylus or contact probe 14 is a shielded unit about the size and shape of a ball point pen. Its body 100 is generally cylindrical in shape and is of metallic material such as aluminum or the like. One end of the body is connected to cable shield 102, which surrounds the probe lead 104, while the other end supports a contact rod 106 by means of an insulative tip 108. Probe 14 may also be insulated, for example, by coating body 100 and cable shield 102 with insulative material such as an organic polymer or the like. Alternatively, body 100 may be of insulative material with an internal or external shield of conductive material.

Rod 106 is a hollow tube closed at its exposed end by a substantially flat portion which provides a broad contact pad 112. Rod 106 is slideably mounted within the body by means of washer 110 and tip 108 and is spring biased from an insulative stop 114 by spring 115.

Lead 104 which extends from control unit 10 is connected within the body to a contact spring 116, and rod 106 carries a bulge or protuberance 118 which makes connection to spring 116 when the rod 106 is depressed within the body. Spring contacts 116 are mounted around the probe point 106 and insulated from body 100 by sleeve 120. Since rod 106 is biased towards the point of the probe, stylus 14 is in an open circuit condition until positive pressure is applied to the point.

Other coupling means are possible of course. In some instances it may be possible to utilize direct contact of the student to complete the circuit. For example by touching the desired element, the student could provide a capacitive coupling to ground. Moreover, the common lead from the book could be eliminated by providing a probe having dual leads and contact points. This could be accomplished for example by separating contact rod 106 and spring 116 of FIG. 8 into two halves with an additional lead extended within jacket 100 to the other half of spring contact 116. Various arrangements of the dual probe are also possible. For example, a coaxial tip would be quite suitable.

The dual contact probe would of course require that two contact points of each element be exposed on the page. This could be provided for example by extending the underlying electrode of FIG. 3 beyond the upper electrode to a vertical conductor extended through the dielectric. Other arrangements are also possible. For example, the vertical conductor could be extended through the plastic film and an opening of the upper electrode to provide coaxial contacts.

The stylus can also be made to automatically reset after the point is depressed. For example, rod 106 could be joined at its internal end to a Belleville spring which has large displacement. The spring plate would carry a contact which closes with a lead contact mounted on washer 114 only when the spring is driven past dead center. Hence once the point probe is depressed, contact will be made and the point 106 will automatically be returned to its forward position and the circuit again opened.

In FIG. 9, a more detailed block diagram of the preferred embodiment of the teaching system is shown. Herein, electrode group 18 is shown as four capacitors having one electrode in common connection to an oscillator unit 130, by means of lead 26, and the other electrode of each being available for selective coupling to the unit by probe 14. In this embodiment, oscillator unit 130 provides an AC oscillation whose frequency is determined by the reactance of the element (that is, the particular value of the capacitor) chosen by the student.

Hence, each capacitor in cooperation with oscillator unit 130 provides a particular frequency, designated as $F_1$, $F_2$, $F_3$ and $F_4$ which are fed to a multichannel tuned amplifier 132. This amplifier provides a frequency sensitive circuit, or filter unit, for each of the four respective frequencies. Hence, oscillator 130 provides a sensor which identifies the selected element and provides an output representative of the value of the element selected. Tuned amplifier 132 provides the information channels which are selected or triggered by the sensor. The output of each filter unit is then fed to separate indicators $A_1$, $A_2$, $A_3$ and $A_4$ of the instruction indicator unit 134 which provides a positive response by conventional optical, audio or printing devices or the like so as to provide suitable directional feedback to the student. Consequently, the tuned amplifier unit provides four information channels which are frequency dependent and thus are responsive to the encoded element selected by the student.

Advantageously, a signal can be taken from indicator possible. For example, the unit is adaptable for data process, inventory control, business and industrial control, cataloguing, indexing, opinion sampling and diagnostic determinations.

In any modification, the book and control unit can be adequately programmed to suit particular circumstances and individual needs. For example, in a programmed instruction mode, the first lesson of each page could be one track of a program such that a correct answer of each would result in a direction to the first lesson of the next succeeding page whereas an incorrect answer results in a direction through a remedial path or branch of the program; for example to the next lesson the same page. Hence, the particular answer selected in any case can be indicative of the state of knowledge of the student to which the feedback is then related in accordance with the coordinated programs of the book and control unit.

Consequently, book 12 provides a considerable amount of logic or stored data in both printed and electrical form. The printed indicia provides a means of communicating information to the student while the electrical elements provide a selectable data input to the control unit which may, in turn, record student progress as well as feedback instructional directions and advice.

The encoded data may be provided within the book in a number of ways; for example, it could be provided in an optical form, such as coded printing or the like, as well as in electrical form. For example, the encoding could be made up of capacitive, inductive, resistive or magnetic elements or combinations of these, and high dielectric or high permeability material or combinations of all of them may also be employed.

As illustrated in FIG. 3, electrical elements comprising thin film capacitors are employed as the encoded information means of the preferred embodiment. Two capacitor groups 18 and 20, are illustrated adjacent lessons 22 and 24 respectively. Elements of each group are coupled or connected on one side in common to conductive strips 42 and 44 at the binding edge of the page, while the other side of the element is exposed at the page surface.

Two element groups are shown to illustrate the use of multiple binding leads, however, it should be understood that each group includes a plurality of selectable electrical inputs in connection to a common circuit branch and that one to four groups, each having its own conductive strip, may be quite practical. The choice of utilizing more elements within a group rather than several groups is dictated by practical considerations of capacitor tolerance and control unit sensitivity. Finally, since group 18 is representative of group 20, only the former is described in relation to FIG. 3.

In this example, each group of elements is made up of four different capacitors. Group 18 includes capacitors 52, 54, 56 and 58 which are deposited as an overlay 50 of page or sheet 16. Each capacitor is coordinated with or identified with one answer of the multiple choice answers 60 of lesson 22. The capacitors comprise electrodes of thin conductive material such as aluminum or silver or the like separated by a thin film of plastic 70 such as polyester or the like. The capacitors include underlying electrodes 62, 64, 66 and 68 and upper electrodes 72, 74, 76 and 78 which also provide an exposed contact pad or stylus target for selection by the student. This is illustrated in FIG. 4 which depicts a cross section of page 16 taken along line 4—4. Herein, overlay 50 is shown on page 16 with underlying electrode 62 in contact with conductor 42 at the page edge. Upper electrode 72 is separated from electrode 62 by dielectric film 70 and is exposed for use as a contact point for selective coupling to control unit 10.

In this embodiment, the width of each lower electrode is different in each case and hence provides a different capacitive value for each information element of the group. Hence, electrode 62 is made approximately equal to its upper electrode 72 whereas electrodes 64, 66 and 68 each have successively reduced widths. Consequently, their respective capacitors have proportionately smaller capacitance since other parameters remain constant. In a specific example, capacitors were constructed with 1¼ inch long electrodes and .25 mil thick dielectric of polyester. A ¼ inch wide upper electrode was employed in each case with lower electrodes of $\frac{1}{16}$, $\frac{1}{8}$, $\frac{3}{16}$ and ¼ inch. This provided capacitances of 200, 400, 600 and 800, pf., respectively.

Advantageously, this construction provides different electrical value (reactance, in this case) for each choice of answer while the physical difference in elements is hidden from the student. Hence, the electrical elements provide a cryptographic encoding in that the electrically coded information (which generally will be different from that of its coordinated indicia) is not decipherable by the operator.

Generally, aluminum is preferred for the electrode material since it is more inert in the expected environment than for example zinc which tends to absorb water. It is also sufficiently flexible, and is long wearing and does not easily form surface compounds which inhibit electrical contact. Finally, it is also compatible with the polyester substrate.

Other means of varying the capacitance, for example by varying the relative length or overlap of each electrode, may also be useful. However, these arrangements increase manufacturing problems and, in some cases, allow the variations to be apparent to the student who may quickly correlate the physical appearance of each to machine response.

In the illustrated embodiment, the sheets are printed in a programmed arrangement with the printed multiple choice answers referenced to their corresponding electrical element by aphabetical or numerical designation; for example, each is designated as $A_1$, $A_2$, $A_3$ or $A_4$. Alternatively, each stylus target could be merely aligned with, or otherwise positioned on the page to correspond with its respective answer, rather than the alphabetical designation thereof.

In a preferred construction, the page is prepared by first printing the indicated indicia. Then the conductive strips and the electrical elements are deposited in that order. Strip 42, for example, may be provided on the page by depositing thereon a conductive material such as nickel, silver, copper or the like. This may be accomplished by any suitable means such as rolling, silk screening, decal transfer techniques or the like.

The capacitance elements may also be deposited by similar means, however, in this embodiment, capacitor groups 18 and 20 are constructed in the form of an overlay 50 as shown in FIG. 5. In this case, continuous metal strips are deposited on opposing surfaces of a long roll of thin dielectric strip 70 by vacuum deposition, silk screening or the like. The difference between capacitors being fixed at this time by control of the width of the underlying electrode strips. Thereafter, short segments of any desired length are cut from the roll to provide the overlay 50 which is then mounted or fixed on the printed page with the lower electrodes of each group in contact with the conductive strips 42 and 44 respectively and with each capacitive element coordinated with its proper indicia. Attachment of the element overlay to the page is made by any conventional means, such as by cementing with a solvent bond or heat sealing of the plastic to the paper or the like.

The pages are then stacked in book form as shown in FIG. 6 with each common conductor 42 and 44 connected to conductors 82 and 84 of scrim 86 at the back of the stack. For example, the strips 42 and 44 may be taken to the binding edge of the page that is into the spine of the signature; with connection to the conductive areas of the binding made by conductive adhesive or the like.

Scrim 86, which is a cloth or gauze material utilized in conventional book bindings, is provided with conductive strips 82 and 84 by metallizing extended areas along and through the scrim. For example, the fibers of the response while only the different range of values of the second group would trigger a second response and so on throughout the book. For example, once the first answer is chosen, the circuit may be made to automatically change the value of the primary capacitor 178 or coil 140 of the oscillator so as to require a different value of book capacitance to provide the same frequency for triggering the information channel.

In this way the system may be coded or synchronized with each lesson so as to avoid its circumvention. This concept can also be utilized to force students through certain program branches and through drilling exercises or the like.

Other means of increasing the logical factors and of synchronizing the instructional control unit to each lesson, or page, are also possible. For example, the logical factors can be increased by utilizing resistive or inductive elements in addition to or in combination with the described capacitive elements.

The page or lesson can also be synchronized to the control unit by providing a synchronizing element for each lesson. For example, one or more capacitor values sufficiently different from the answer group could be chosen. These would be provided on the page in a manner similar to that suggested for the answer capacitors, however the coding capacitors would be coordinated with each lesson; for example be positioned adjacent the lesson title, etc.

The answer channels are then arranged so as to be cut off until the proper lesson channel has been triggered. For example, assume that four lesson elements are utilized; each having its own information channel which energizes (by means of a controlled rectifier or the like) or couples the indicator in the circuit for reception of the student answer. The unit is designed to operate only if the answer elements are chosen in the proper order.

For example, each of the first four lessons are provided with a coding or synchronizing capacitor. These are arranged in ascending order of value or in any prearranged order and the circuit is designed such that each must be triggered in turn in order to operate the unit. Thus the student must, in each case, contact the lesson element with the probe and then his chosen answer. Once the sequence of lessons has been completed, the unit by means of a counting circuit or the like is automatically reset to repeat the cycle with the next four lessons, etc. Again, the many diffeernt logical factors suggested for the answer elements can also be employed for the lesson elements. Hence, the system can provide a varied response which is tailored to the particular program.

Figure 12:
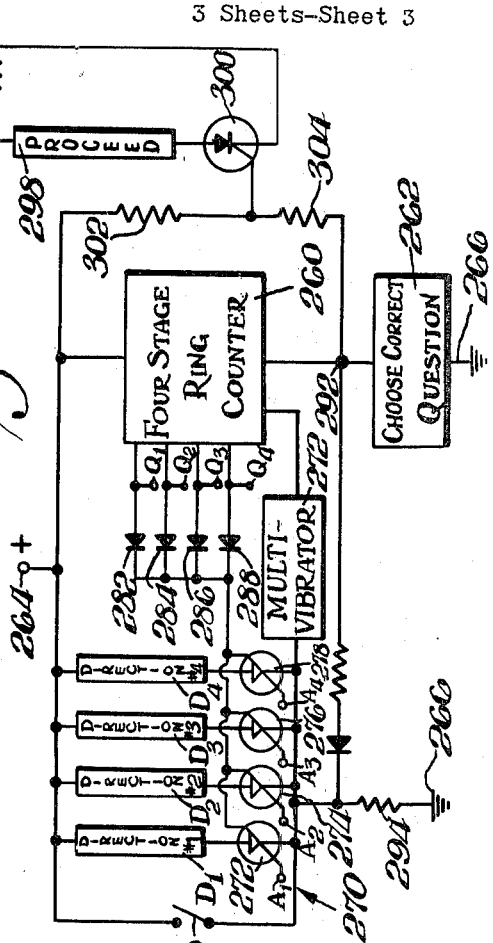
FIG. 12 is a schematic diagram of indicator circuits of an alternative embodiment.

In FIG. 12, an indicator circuit designed for four answer elements and four question elements is shown. The book arrangement is similar to that shown except that an added element such as a capacitor is provided for each lesson. Four question elements would be utilized with this circuit. Each would be different from similar elements of its group and the question group would be an order of magnitude different from the answer elements. Four question elements are chosen in this example however any practical number may be used. In any case, one is assigned to each lesson to provide synchronization.

A four stage ring counter 260 is employed in the circuit of FIG. 12. Ring counter 260 is modified from the conventional unit in that four terminals $Q_1$, $Q_2$, $Q_3$ and $Q_4$ are brought out from the "off" gate of each stage. Ring counter 260 and synchronizing lamp or indicator 262 are in series with a positive voltage source 264 and ground 266 so that as long as any stage of counter 260 is on, indicator 262 is also on. This indicator directs the student to choose the correct question.

The ring counter input 268 (which turns on each stage in succession) is taken from the answer unit 270 through a pulse shaping one shot multivibrator 272. Answer unit 270 is made up of four SCS devices 272, 274, 276 and 278. Each SCS is in anodic connection through lamps or indicators $D_1$, $D_2$, $D_3$ and $D_4$, respectively, to source 264 and in cathodic connection to ground 266. The "on" gate of each SCS is connected to a respective answer terminal $A_1$, $A_2$, $A_3$ or $A_4$ and the "off" gate of each is connected in common to the question terminals $Q_1$, $Q_2$, $Q_3$ and $Q_4$ through respective diodes 282, 284, 286 and 288.

The apparatus is operated by the student first closing a start switch 290 which triggers counter 260 and turns on its first stage and indicator 262. The student must then choose the correct question to turn off this stage.

In this case, the student must contact question element #1 before indicator 262 will go off. As long as indicator 262 is on, the source voltage is across it, between junctions 292 and 266. This provides a voltage across resistor 294 and biases the answer stage such that it can not be switched on. Hence the answer stage can not turn on the indicators $D_1$, $D_2$, $D_3$, $D_4$ or switch counter 260 to another stage.

Once the student picks the right question and contacts the stylus target, the operating stage of counter 260 is shut down along with indicator 262. Then answer unit 270 is ready to operate. Contact by the student of one of the answer elements provides input to one of the answer terminals $A_1$, $A_2$, $A_3$, or $A_4$ which turns on one of the SCS and its respective indicator. The switching on of one stage of the answer unit also energizes multivibrator 272 which switches counter 260 to the next successive stage and turns on indicator 262. Hence, the unit is reset for the next lesson.

In this circuit, each answer indicator $D_1$, $D_2$, $D_3$ or $D_4$ remains on until its respective SCS is turned off. The latter is accomplished by any question signal. Hence, input of a signal to any question terminal also provides gate bias to the "off" gate of each SCS of answer unit 270. The signal placed on any question terminal is blocked from other question terminals by the blocking diodes 282, 284, 286 and 288 respectively.

A "proceed" indicator 298 can also be included to indicate that the student is ready to answer. This is energized from an AC source 302 by means of a silicon controlled rectifier 300 which is gate biased by a divider network of resistors 302 and 304. Resistors 302 and 304 are in parallel with ring counter 260 and are high in resistance as compared to counter 260 such that SCR 300 is triggered only when the resistance drop across counter 260 is high; that is when all stages of the counter are off. Hence, indicator 298 turns on only when counter 260 and indicator 262 are off. It should also be noted that SCR 300 is AC energized and will remain on only so long as the proper gate signal is received. Hence, indicator 298 will turn on each time counter 260 is off and will turn off each time the counter is on.

A single control unit may also be designed for use with a variety of books by altering its synchronization accordingly. For example, an indexing or synchronizing card or tape or the like can be utilized to match a universal control unit to each book by varying the unit response in accordance with the lesson program.

Other means of coordinating the control unit to the book or lesson are also useful. Since any particular page of the book must be a unique number of pages from either cover of the book, synchronization of the page to the instructional control unit (identification of the page) may be provided by allowing the unit to sense the series values of the combined elements of the remaining pages yet to be studied. That is, if the capacitive elements shown in the illustrated example are exposed on both sides of the page, the underlying electrode of one page can be designed to contact that of the next.

Hence, if the common conductor is arranged at the back cover of the book (rather than in the binding) so as to contact only the underlying electrodes of the last page, the input to the sensor unit (upon selection of an answer by the student) will be the total series capacitance 134 or directly from amplifier 132 for timing, counting and totalizing so as to compile a complete record of student progress. This may be accomplished by any conventional timing, counting and recording unit, and the continuous values of recorder 136 may be provided to either the student or teacher or both. In this example, the recording unit is illustrated as having four sections $A_1'$, $A_2'$, $A_3$, and $A_4'$ which are directly responsive to the indicating channels.

Since many different types of conventional recording units may be utilized for the counter and totalizer, only the oscillator and tuned amplifier are described in detail herein and are schematically illustrated in FIG. 10. As shown in this figure, oscillator 130 is a standard Hartley transistor oscillator which includes the selected capacitance of book 12. This capacitance is coupled in parallel to oscillator inductance 140 in the collector circuit of transistor 142, and consequently, controls oscillation frequency.

Oscillator 130 is coupled to amplifier 144 by coupling capacitor 150, and amplifier 144 which includes amplifying transistor 146 and emitter follower 148 is coupled, in turn, to a tuned circuit 152 by coupling capacitor 154.

A positive voltage of 16 volts is applied to oscillator 130 and amplifier 144 from terminal 156 through resistor 158 and line 160. Similarly, tuned circuit 152 is connected to a 20 volts DC source at terminal 162 by means of line 164 and dropping resistor 166. The other side of these circuits is connected in common to ground terminal 168 by line 170.

Oscillator transistor 142 is biased by connection to source 156 and ground 168 through inductor 140 and resistor 172 and its base is biased by connection to these terminals through resistors 174 and 176 respectively. The oscillating frequency of the circuit is primarily controlled by capacitor 178 which connects the emitter of transistor 142 to tapped coil 140. Selection of a particular book capacitor (by contact with probe 14) puts it in parallel with coil 140 and thus determines a particular frequency $F_1$, $F_2$, $F_3$ or $F_4$ of the oscillator.

Amplifier 144 includes transistors 146 and 148 which make up a conventional amplifier and emitter follower combination. The base of transistor 146 is driven by the signal from oscillator 130 and is DC biased from source 156 and ground 168 through resistors 180 and 182. The emitter and collector of this transistor are biased by connection to these same terminals through resistors 184 and 186. Finally, transistor 148 is biased by direct connection of its collector to source 156 and its emitter to ground through resistor 188.

The amplified frequency is fed from the emitter of transistor 148 to the base of transistor 192 of the tuned circuit. Transistor 192 is biased by connection of its base to source 156 and ground 168 through resistors 191 and 193, respectively. Its collector 194 is connected to line 164 through a parallel network of four resonant tank circuits and its emitter 196 is connected to ground through resistor 198.

Tank circuits 200, 202, 204 and 206 are standard if transformers which have been broadbanded for this embodiment. For example, Tashiba #737A20347 transformers, which have been damped slightly to broadband them, are suitable. These units are connected in parallel with one end of the reasonant loop connected to line 164 and the other end to collector 194. The output of each tank circuit, that is, signal $A_1$, $A_2$, $A_3$ or $A_4$ is taken from the transformer primary, one end of which is tied to ground. Each transformer is tuned to a frequency corresponding to the frequency of oscillator 130 for a selected book capacitance. For example, with an oscillator inductor of 1 millihenry and an oscillator capacitor of .001 µf., one tank circuit is tuned to 505 kHz. so as to provide a response when a capacitance of 100 pf. is selected. Similarly, the remaining tank circuits are tuned to 357 kHz., 291 kHz. for 200, 300 and 400 pf., respectively.

The following table lists a typical set of component values for operation of the circuit shown in FIG. 10.

Figure 11:
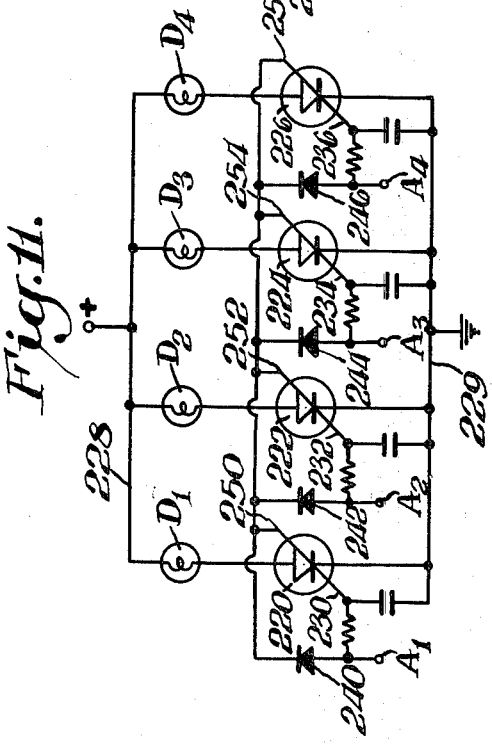
FIG. 11 is a schematic diagram of the indicator circuits utilized in one embodiment of the invention.

Transistors 142, 146, 148 and 196—Sprague #2H3860
Inductor 140—1 millihenry
Resistors 158, 166, 172 and 184—1000 ohms
Resistor 174—4.7K ohms
Resistor 176—10K ohms
Capacitor 150—.01 µf.
Capacitor 154—.05 µf.
Capacitor 178—.001 µf.
Resistors 180 and 191—4.7K ohms
Resistors 182 and 193—2.2K ohms
Resistors 186 and 188—680 ohms
Capacitors 190 and 208—.1 µf.
Resistor 198—470 ohms The output of the tuned amplifier is then fed to indicating unit 134 by means of pulse shaping networks such as one shot multivibrators. An example of a suitable indicating circuit is shown in FIG. 11 wherein four silicon controlled switches, hereinafter called SCS, are shown in series with individual indicator lights or direction indicators $D_1$, $D_2$, $D_3$ and $D_4$. SCS switches 220, 222, 224 and 226 are arranged in anodic connection to one of the lamps and through it to a positive voltage source 228 and in cathodic connection to a common ground line 229.

The "on" gates 230, 232, 234 and 235 of each SCS respectively, is connected through an RC circuit to the shaped output of each answer channel at terminals $A_1$, $A_2$, $A_3$ and $A_4$. These are, in turn, each connected through diodes 240, 242, 244 and 246 respectively in common to "off" gates 250, 252, 254 and 256.

In operation, a signal delivered to one of the answer terminals $A_1$, $A_2$, $A_3$ and $A_4$ passes through its respective diode to the common "off" connection 248 and turns off any SCS (and its indicator) that is on. After a suitable (very short) delay resulting from the RC circuit of the "on" gate, the chosen SCR is then turned on and remains on, holding one of the indicators on.

The diode is provided in each case to prevent energizing of the RC circuit of any SCS through the common "off" line 248. Advantageously, as long as a signal is provided at any answer terminals the indicator lights are off and thus the student must remove the probe before his answer is indicated. Thereafter, since the SCS source is DC, the chosen indicator remains on until a new answer is chosen.

Other circuits would also be useful for triggering the information channel in accordance with the selected book capacitance. For example, a conventional bridge circuit as usually employed for detecting capacitance value could be utilized to produce a voltage proportional to each element. A multivibrator or unijunction oscillator could also be used in a circuit arrangement in which the selected book capacitance would determine the frequency which is, in turn, identified by tuned circuits or gating circuits.

In the illustrated emobdiment, both groups of eencoded elements are made identical, and although this is quite satisfactory for use in inventory and diagnostic instruction, where the operator has no reason to try to beat the system, it is open to cheating on the part of a student whose only interest is to record as many right answers as possible. In the latter case, the student could keep probing the right answer to the first question.

This may be circumvented in the inventive combination by increasing the logical factors of the unit. For example, by varying the electrode area, the dielectric constant and the dielectric thickness, many different capacitive values can be provided. In this case, the same four information channels could be utilized, or any number could be provided as desired.

Assuming that the same four answer channels are to be employed, the system could be designed such that the capacitive values of the first group would trigger the first of the aligned capacitors of each page remaining to be studied. This total will change as the student progresses through the book.

An additional conductor could also be placed on the front cover so as to allow the back of each page to be employed for programmed answers. In this case, contact with an element of the back of the page (left page of the book) would read the series values of pages already studied while contact of an element on front of a page (right-hand page of the book) reads values of remaining pages. Finally, additional conductors could also be positioned at intervals throughout the book to further increase its versatility. Many types of electrical elements may be utilized in this manner so as to cause the control unit to read only the element of the page (for example by a dual contact probe) or the total of any number of pages or combinations of these.

Other means of providing encoded information would also be useful. As indicated, coded indicia could be utilized with an optical probe. Magnetic material of different reluctance could also be utilized with a flux sensing probe. In addition, simple contacts could be provided on the page with each in connection to a separate conductor of the book. In this embodiment, the position of the correct answer contact would vary from page to page, however, it would be in all cases connected within the binding to the same binding conductor.

As indicated, a continuous record of student progress may be provided on punched tape, thermally printed tape, magnetic tape or the like. These may be automatically printed in each control unit or at a remote location, or both.

In the preferred embodiment, the record is provided in a novel answer array or answer matrix of the type illustrated in FIG. 13. Herein, a strip 310 of paper or plastic, or the like, is marked with indicia representing each answer and the time of answering.

Each answer is automatically recorded by conventional printing, thermal printing or punching or the like in a particular longitudinal track or channel along strip 310. Hence, the time is recorded at one edge of the strip in a first channel 312. The correct answer is recorded, each time it is chosen, in another track 314 alongside the first, and other answers in still further tracks. Hence, answers $A_1$, $A_2$, $A_3$ and $A_4$ are recorded in channels or tracks 314, 316, 318 and 320 respectively.

This provides a geometric answer array wherein student comprehension is evident from the transverse displacement of the answer marks away from the correct track 314. Thus, it provides in graphic form, a permanent record of student progress and comprehension. The record is both man and machine readable and is easily evaluated by the teacher.

The array may also indicate the student's program path through the book. The markings which are displaced transverse to the correct track can indicate remedial paths. For example, if only the correct answers are recorded and answer channels 316, 318 and 320 are representative of correct answers to questions of remedial paths, the transversely displaced markings are representative of the student path.

In a still different embodiment, all correct answers are recorded in longitudinal track 310. Herein, correct answers to lessons of the remedial branches or subtracks of the program are recorded between answers to the main program track and responses recorded in channels 316, 318 and 320 represent $A_2$, $A_3$ and $A_4$ answers to either main lessons or remedial lessons depending upon their longitudinal displacement.

For example, assume a single program track with a remedial path of four questions for each primary lesson. Then answers to each primary lesson will occur in every fifth space along the length of the tape with answers to remedial paths being recorded in intervening spaces. In each case responses recorded in answer tracks 314, 316, 318 and 320 will be representative of responses $A_1$, $A_2$, $A_3$ and $A_4$. Markings are recorded only for questions answered, so a perfect paper would have a mark every fifth space in track 314.

Hence, markings displaced from track 314 will provide a measure of the quality of student progress and the longitudinal spaces which are marked will provide a measure of student bite or comprehension span.

Many different embodiments are possible. For example the sensor may be a conventional capacitive measuring device modified to utilize its voltage or current output to trigger appropriate information channels. A circuit of this type may provide a fixed frequency which when coupled to a particular element will provide an output voltage or current (normally used to drive a meter) which is proportional to the impedance of the coupled element. This output may be utilized to trigger a particular information channel by means of conventional logic circuits.

As indicated, the inventive concept may be employed in apparatus designed for testing and drilling as well as programmed instruction. In these, the encoded sheet may be separately used, or may be organized in scroll or book form.

The encoded sheet may be arranged in many different ways. Pages having two or more columns may be employed. In these the conductors may extend between the columns to the top or bottom of the page, as well as other edges, for connection to a control unit, and a plurality of pages may be bound or hinged at the top in a tablet form. This construction can simply connect to the book and is quite suitable for testing.

All pages of the book may be encoded, or these may be interspersed with conventional pages. The answer logic in each case may be obvious to the operator, for example, in inventory control where information of each encoded element may be substantially the same as that of the printed indicia. Or the logic may be hidden from the student; as in the binding or beneath the stylus target or the like. This in addition to the program scramble possible throughout the book provides many different uses.

Operator response can also be stored by means of the encoded information. Thus the page or book may be utilized to temporarily or permanently record response for later automatic reading by machine. In this case, the encoded information element may be altered, such as by shorting out the element or the like. For example, a conductive mark may be made on the page between contact points or the capacitor of the illustrated embodiment may be shorted by puncturing through the dielectric. Moreover, the stored response may be combined with immediate feedback to the operator by allowing the described stylus to first read the element value and then alter it. The stored response could be very suitable for testing, inventory control, and diagnostic evaluation where evaluation is desirable after use and at a remote location.

Many variations of the apparatus are possible. As indicated, the encoded information could be provided in many different ways. Simple continuity can be utilized as well as combinations of resistance, capacitance and inductance, etc. For example, each element shown on page 16 of FIG. 1 may be merely conductive portions connected to separate circuit means of the control unit by separate conductive paths of the page or book binding or the like. Selective coupling of a particular circuit to the control unit can then be made by contact of the described stylus to the selected element. This coupling can also be accomplished by shorting one element or contact to another element of the page, for example, by shorting one element to an adjoining element of the page with a shorting bar or stylus. Moreover, any of the illustrated elements, or conductive areas in this example, may be selectively coupled to a common conductor of the page, so as to complete the circuit. For example, a common conductor may run alongside the ends of the exposed contacts to permit selective coupling to the control unit by shorting of an element to the common conductor. This effectively eliminates the need for a lead from the stylus to the control unit.

Hence, both circuit connections may be provided on the page by means of conductive portions exposed thereon. Moreover, the contacts or coupling points of the page may also utilize elements of different electromagnetic value so as to further increase the logic factors. For example each of the capacitors of FIG. 3 may be connected on the page or in the binding to individual conductive paths, and thus, to separate circuit means of the control unit. In this case, completion of the circuit may be through the probe lead or by coupling of the element to another conductive path of the page.

Consequently, elements having different values may be connected jointly or individually to conductors of the page or binding. Moreover, these elements may also be incorporated in or on the page without connection other than to a stylus target. However, in the latter case, the probe would have a complete circuit which evaluates the element or reacts to it and transmits a corresponding impulse to the control unit.

Other variations are also possible. In any embodiment, true or false answers can be utilized. Thus one element coordinated with one answer of a question may provide a true or correct response while all other encoding elements of that question would provide false response and trigger an appropriate indicator channel.

Many different programs may also be embodied in the inventive structure. Linear and branching programs, with immediate or delayed response may be employed. Moreover, all of the instructional material may be provided within the encoded book, or may be included in supplemental books or other teaching aids. The encoded book may also be provided as an auxiliary aid or supplement to a conventional book. In this case, the encoded book may be utilized in various modes from simple testing to complete program control of the student path through the main book.

The novel structure may also utilize programmed tests. That is tests which include branching such that the test program is automatically tailored to each students comprehension of the subject matter being tested. This modification is useful of course for conventional education as well as for diagnostic control.

The apparatus is also applicable for use in language laboratories. In this case, the encoded book may not only provide programmed instruction but additional information. For example, particular encoded elements may provide pronunciation or translation of the word or sentence with which it is coordinated, or combinations of them. In this sense, the apparatus is utilized as a talking dictionary.

Consequently, it should be understood that many different modifications are possible without departing from the spirit and scope of the described invention and that the invention is not to be limited except by the appended claims.

What is claimed is:

1. An apparatus comprising a sheet having information bearing indicia coordinated with encoded information in the form of capacitors thereon, at least one of said capacitors having a capacitance different in value from the capacitance of the other capacitors, and said capacitors being selectable by an operator for coupling to a sensing means for communication of information thereto in accordance with the capacitance of the selected capacitor.

2. The apparatus of claim 1 including a plurality of said sheets arranged in the form of a book.

3. The apparatus of claim 2 wherein at least one capacitor of a sheet which provides one page of said book differs in capacitance value from at least one capacitor of another sheet which provides another page of said book.

4. The apparatus of claim 1 wherein said sensing means includes a plurality of information channels, said channels being responsive to the capacitance of at least one of said capacitors and energized in accordance therewith.

5. The apparatus of claim 4 wherein said plurality of capacitors includes a synchronizing capacitor having a capacitance different from other capacitors of said plurality, said sensing means includes a triggering circuit which controls the response of said information channels to said capacitors, and said trigger circuit being responsive to the capacitance of said synchronizing capacitor and triggered in accordance with the coupling thereof to said sensing means so that said information channels are placed in a responsive condition and may be energized by selection of another of said capacitors.

6. The apparatus of claim 4 wherein said sensing means provides a fixed frequency which in combination with the capacitance of said selected capacitor provides an output voltage proportional thereto, said sensing means including means for conducting said output voltage to said channels, and said information channels being voltage dependent such that each is responsive to and energized in accordance with a particular voltage resulting from the frequency combination with a selected capacitor.

7. The apparatus of claim 4 wherein said sensing means includes an indicating means responsive to said energized information channel, and said indicating means provides a directional control feedback to said student in accordance with said selected capacitor.

8. The apparatus of claim 4 wherein said sensing means includes means for recording information of said energized channel.

9. The apparatus of claim 8 wherein said recording means records the selected responses of said operator in a graphic answer array wherein correct responses are longitudinally recorded and the record of incorrect responses are laterally displaced therefrom in accordance with the quality of said answer.

10. The apparatus of claim 9 wherein said operator's program path is graphically displayed in said answer array.

11. The apparatus of claim 4 wherein one electrode of each of a plurality of said capacitors is connected in common through a conductive path, said conductive path being adapted for electrical communication with said sensing means, and the other electrode of each capacitor being selectable for coupling to said sensing means so that the capacitance associated with the selected electrode is coupled thereto and energizes one of said channels in accordance therewith.

12. The apparatus of claim 11 wherein each of said capacitors include a pair of thin substantially planar electrodes at least partially overlying each other and separated by a dielectric spacer, and said other electrode is uppermost on said sheet and includes an exposed portion for selective connection thereof to said sensing means.

13. The apparatus of claim 12 wherein each of said capacitors have different capacitance values.

14. The apparatus of claim 13 wherein said electrodes vary in area or in their overlapping arrangement to each other so as to provide said difference in capacitance.

15. The apparatus of claim 12 wherein said uppermost electrodes are arranged so as to mask any difference in the lower electrodes thereby providing a uniform appearance of said capacitors.

16. The apparatus of claim 11 wherein said sheet includes at least one additional group of capacitors coordinated with information bearing indicia, and one electrode of each of said additional group of capacitors being connected in common to another conductive path which is also adapted for electrical communication to said sensing means.

17. The apparatus of claim 16 wherein the capacitors of said additional group have capacitance values substantially the same as those of the first group.

18. The apparatus of claim 11 wherein said capacitors include circuit means having spaced apart conductive portions exposed on said sheet, and said encoded information being communicable to said sensing means by said operator selectively coupling together at least two of said conductive portions.

19. The apparatus of claim 11 including a sensing stylus connected to said sensing means, said other electrodes having a conductive stylus target on a surface of said sheet, and said encoded information being communicable to said sensing means by said operator coupling said stylus to said stylus target.

20. The apparatus of claim 19 wherein said stylus includes a switch which is operable each time said electrodes are coupled to said sensing means by contact of said stylus to said stylus target.

21. The apparatus of claim 19 wherein a plurality of said sheets are arranged in book form, and said conductive path extends to at least a perimeter portion of said book for coupling to said sensing means.

References Cited

UNITED STATES PATENTS

| | | | |
|---|---|---|---|
| 2,546,666 | 3/1951 | Fleischer | 35—9 |
| 2,724,910 | 11/1955 | Kelly | 35—9 |
| 2,953,859 | 9/1960 | Fink | 35—9 |
| 3,057,082 | 10/1962 | Wellington et al. | 35—9 |
| 3,141,244 | 7/1964 | Smith | 35—9 |
| 3,177,595 | 4/1965 | Yonker et al. | 35—9 |
| 3,187,443 | 6/1965 | Schure et al. | 35—9 |
| 3,316,660 | 5/1967 | Greenspan | 35—9 |
| 3,382,588 | 5/1968 | Serrell et al. | 35—9 |
| 3,401,470 | 9/1968 | Gaven | 35—9 |
| 3,421,231 | 1/1969 | Kane | 35—9 |

EUGENE R. CAPOZIO, Primary Examiner

W. H. GRIEB, Assistant Examiner

PO-1050
(5/69)

UNITED STATES PATENT OFFICE
CERTIFICATE OF CORRECTION

Patent No. 3,522,665        Dated August 4, 1970

Inventor(s)  Charles G. Kalt

It is certified that error appears in the above-identified patent and that said Letters Patent are hereby corrected as shown below:

Column 1, line 69, change "cerative" to -- creative --
Column 5, line 13, after "lesson" insert -- of --
Column 6, line 33, change "aphabetical" to -- alphabetical --
Column 9, line 8, change "$A_3$" to -- $A_3'$ --
Column 10, line 2, after "kHz" insert -- and 252 kHz --

SIGNED AND
SEALED
OCT 20 1970

(SEAL)
Attest:

Edward M. Fletcher, Jr.
Attesting Officer

WILLIAM E. SCHUYLER, JR.
Commissioner of Patents